United States Patent [19]
Carpenter

[11] Patent Number: 5,139,467
[45] Date of Patent: Aug. 18, 1992

[54] SPRING RETAINER FOR LIMITED SLIP DIFFERENTIALS

[75] Inventor: Phil P. Carpenter, Auburn, Ind.

[73] Assignee: Auburn Gear, Inc., Auburn, Ind.

[21] Appl. No.: 753,442

[22] Filed: Aug. 30, 1991

[51] Int. Cl.$^5$ .............................................. F16H 1/44
[52] U.S. Cl. ..................................... 475/235; 475/231
[58] Field of Search ................. 475/230, 231, 234, 235

[56] References Cited

U.S. PATENT DOCUMENTS

| | | | |
|---|---|---|---|
| 3,400,611 | 9/1968 | Engle | 475/235 |
| 3,402,801 | 9/1968 | Holdeman | 475/235 X |
| 3,489,038 | 1/1970 | Roper | 475/235 X |
| 3,624,717 | 11/1971 | Brubaker | 475/230 X |
| 3,628,399 | 12/1971 | Seitz et al. | 475/230 X |
| 3,864,992 | 2/1975 | Lovdahl | 475/235 |

Primary Examiner—Richard Lorence
Assistant Examiner—William O. Trousdel
Attorney, Agent, or Firm—Pearne, Gordon, McCoy & Granger

[57] ABSTRACT

Spring retainer plates for a slip limiting differential are disclosed. Each retainer plate is paired with a similar retainer plate and is adapted to exert a preload on the side gear clutching mechanism of the differential by coil springs interposed between the plates. Each retainer plate has a transverse wall which is generally parallel to the axis of the pinion shaft and has parallel side walls. Each parallel side wall has a generally circular aperture through which the pinion shaft passes. By providing a complete circle of metal around the pinion shaft, plate deformation or breakage is minimized.

6 Claims, 3 Drawing Sheets

SPRING RETAINER FOR LIMITED SLIP DIFFERENTIALS

BACKGROUND OF THE INVENTION

This invention relates generally to differential mechanisms and more particularly to a limited slip differential mechanism having a biasing mechanism to apply a preload upon clutch members of the mechanism.

As is well known, automotive differential gearing is necessary to transmit motion from the engine to an axle of the vehicle through differential gearing to give an equal tractive force to each of two wheels and, at the same time, permit either of them to run ahead or lag behind the other as may be required in rounding curves or riding over obstructions. The axle is not formed of one solid piece, but motion is transmitted to the right and left hand wheels by means of separate sections, the inner ends of which are attached to the side gears of the differential mechanism. During turning and differential action by the mechanism, one side gear associated with the outer wheel turns faster than the side gear coupled to the inner wheel while both wheels continue to receive driving force.

Such mechanisms adequately solve the problem on dry pavement or other comparatively hard surfaces. However, for example, in snow or mud, in the event that one of the two driven wheels begins to slide or freely rotate, there is essentially no torque transmitted to the other of the pair of driven wheels and the vehicle is stuck simply because one of its two driven wheels is allowed to slip.

To overcome this problem, slip limiting differentials have been developed which provides a clutch within the differential mechanism so that differentiation may occur only after a predetermined torque level is reached. This ensures that both of the driven wheels will receive at least this predetermined minimum torque, even though one of the two wheels is sliding. One such limited slip differential mechanism employs a stacked series of clutch plates and discs each of generally flat, annular configuration with the plates and discs spring biased into contact with one another to provide a friction coupling between the differential case and one side gear with clutch slippage occurring only after a prescribed torque level is achieved. Another limited slip differential mechanism is illustrated in U.S. Pat. No. 3,400,611, wherein a pair of frustro conical clutch members engage corresponding conically-shaped inner surfaces of the differential case. In that patent, springs are employed which operate through the side gears to provide a preload upon the clutch members to restrict differential action. More specifically, compression springs are placed between a pair of spaced-apart plates which have transverse walls in abutting contact with the side gears to transfer the axial load of the springs to the clutch members through the side gears. Each plate has an aperture formed in the transverse wall in alignment with a recess of an adjacent side gear so that a C-washer may be inserted during assembly of the differential to retain an axle shaft. The plate also includes inwardly directed side walls which are provided with semi-circular apertures to cooperate and surround the pinion shaft to properly locate the biasing means within the cavity between the side gears.

Since the compression springs exert a substantial axial force on the spring plates and since this force is generally spaced from the plates' zone of contact with the side gears, bending moments are created in the plates which tend to bend the plates at a thinned zone between the aperture in the transverse wall and the semi-circular apertures in the side walls. To minimize any possibility of failure at this zone, a welding bead has been provided at the intersection of the side wall and the transverse wall.

SUMMARY OF THE INVENTION

This invention overcomes the problem of possible spring plate retainer failure by providing a retainer plate which is capable of resisting bending loads exerted by the preload compression springs of a limited slip differential.

According to this invention, spring retainer plates are provided which have transverse walls which are in abutting contact with the side gears of the differential to transfer the load of compression springs thereto. Each plate includes an aperture formed in the transverse wall in alignment with a recess of an adjacent side gear in concentric relation to the output shaft of the differential. The transverse wall includes straight portions and flared portions to allow for the insertion and removal of a biasing assembly into position between the side gears through a side port in the differential casing. The straight portions are appropriately sized to pass between the pinion gears and are provided with inwardly directed side walls having circular apertures therethrough. The side walls completely surround and define the aperture so that bending loads on the transverse wall of the plate are resisted by portions of the side walls. Each plate is adapted to nest with a cooperating plate so that the side walls of one plate overlap the side walls of the other plate in such a fashion that their apertures are in alignment and encircle the pinion shaft passing therethrough. These apertures receive the pinion pin and serve to properly locate the biasing assembly within the differential housing and additionally serve to retain the biasing assembly within the differential cavity after assembly and cause it to rotate with the pinion shaft about the output shaft center line.

DETAILED DESCRIPTION OF THE INVENTION

Figure 1:
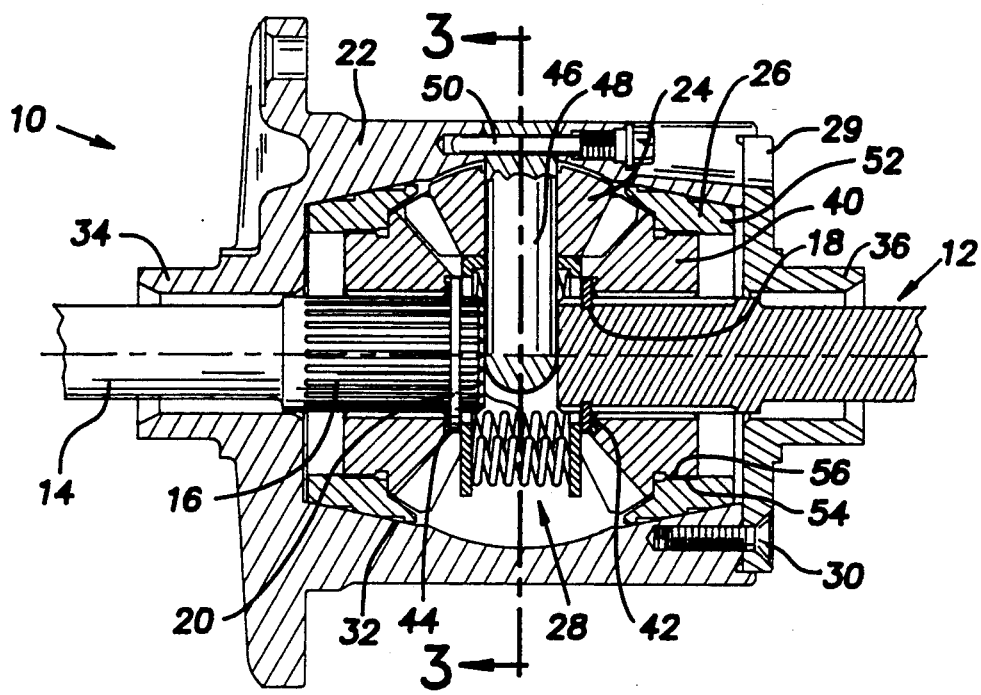
FIG. 1 is a revolved cross-sectional elevational view of a differential mechanism incorporating the invention.

Referring now to the drawings, and more specifically to FIG. 1, there is illustrated a differential mechanism 10 shown in operative association with an axle system 12 of a vehicle. The axle system 12 includes a pair of coaxially aligned output or stub shafts 14 which terminate in splined ends 16 disposed interiorly of the differential mechanism 10 in juxtaposed spaced apart relation. Each splined end 16 includes a groove 18 formed near the inner end of the shafts. A restraining member in the form of a generally flat, split washer 20 is disposed in each of the grooves 18. This washer prevents axial movement of the output shafts 14 outwardly of the mechanism 10.

The differential mechanism 10 includes a casing 22 adapted to receive rotational drive from the drive line (not shown) of a vehicle for transmission to the output shafts 14 of the axle system. A bevel gear system 24 is disposed interiorly of the casing and is operatively connected between the casing and the output shafts 14 to transmit rotational effort to the shafts 14 and simultaneously allow relative movement between the shafts when necessary, as when the vehicle is cornering.

A pair of clutches 26 are also positioned within the casing 22, each one of which is operatively associated with the casing and one output shaft 14 to resist free differential action. A biasing mechanism 28 is disposed with the casing and is operatively associated with the clutches 26 to urge them into a predetermined frictional engagement to provide an initial resistance to differentiation.

The casing 22 is cup-shaped and is closed at one end by an end cap 29 which is secured to the casing by fasteners 30. The interior of the casing 22 is provided with generally frustro conically shaped surfaces forming a pair of spaced-apart, truncated, cone-shaped drums 32 which cooperate with the clutches 26 to provide the aforementioned initial resistance to differentiation.

One end of the casing 22 includes a shaft opening defined by a hub 34. Similarly, the casing cap 29 is provided with a shaft opening defined by a hub 36. The output shafts 14 extend inwardly through the openings defined by the hubs 34 and 36 into the interior of the casing 22.

Figure 2:
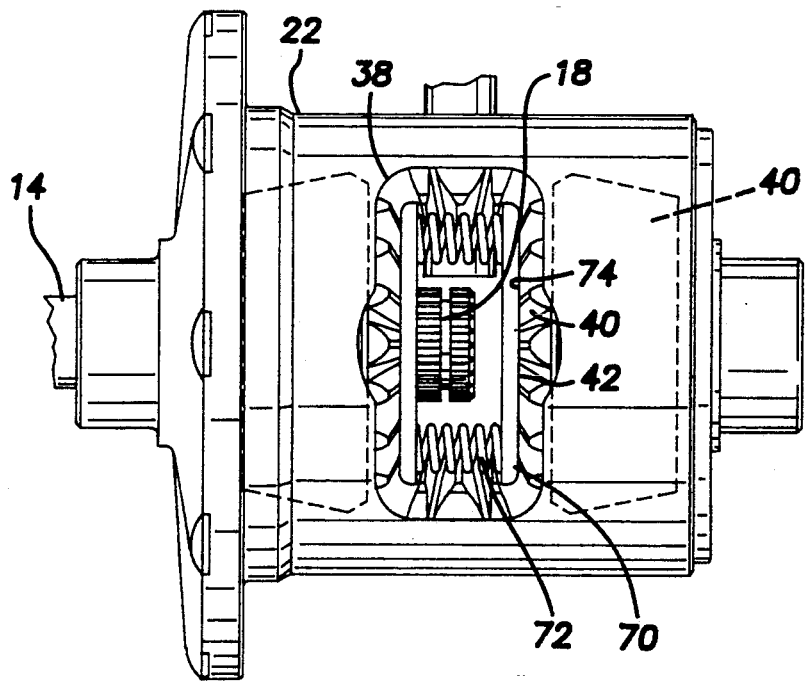
FIG. 2 is an elevational view of the differential mechanism of FIG. 1 with the access port exposed.

A side port 38 (FIG. 2) is provided in the longitudinal wall of the casing 22. The side port opening 38 provides necessary access to the interior of the casing 22 for assembly of the differential mechanism into the axle system.

The bevel gear system 24 includes a pair of side gears 40 each of which is connected to one of the splined ends 16 of the output shafts 14. Each gear is therefore rotatable with, and slidable axially with respect to one of the output shafts.

Each side gear includes a transverse inner face 42 disposed in spaced apart facing relation to the corresponding inner face of the other side gear. The transverse inner face 42 of each side gear is provided with a recess 44 in the form of a counter bore adjacent the output shaft 14. Each recess 44 is sized to receive one of the split washers 20 and serves to restrain outward movement of the output shafts 14.

The bevel gear system 24 further includes a pair of pinion gears 46 rotatably supported by a transverse extending pinion shaft 48. These gears are equidistant from the longitudinal center line of the output shafts 14 in intermeshing engagement with the side gears 40. The pinion shaft 48 extends transversely of the differential casing 22 between the ends of the shafts 14 and is secured to the casing by a removable partially threaded dowel pin 50. The pinion shaft diameter is sized to restrain inward movement of the output shafts 14.

Rotational effort received by the differential mechanism 10 is transferred through the pinion shaft 48 and pinion gears 46 to the output shafts 14 in a well-known manner. Additionally, when relative rotation between the output shafts 14 is required, the bevel gear system 24 provides the necessary system flexibility.

Free differentiation between the output shafts 14 is restrained by the clutches 26 of the differential mechanism. The clutches 26 include a pair of truncated, cone-shaped clutch members 52 disposed for frictional engagement with the conically-shaped drums 32 formed on the interior of the casing 22. Each cone-shaped clutch member is provided with a splined inner bore 54 which engages a splined outer hub portion 56 of each side gear 40. Each clutch 26 is therefore rotatable with and axially movable with respect to its output shaft.

Resistance to rotational effort is accomplished in a well-known manner. Transmission of torque from the pinion gears 46 to the side gears 40 creates separating forces urging the side gears axially outwardly in a direction away from the pinion shaft 48. These forces are transferred to the cone-shaped clutch members 52 which in turn frictionally engage the drum surface 32 of the casing 22 to provide a direct path for transmission of rotational effort to the output shaft 14 to which the clutch member 26 is connected.

As is well known, it is advantageous to provide an initial preload upon the clutch members 26 to urge them into frictional engagement with the conically-shaped drums 32. An initial resistance to free differentiation is established in the differential mechanism which resistance is increased by the axial forces applied to the clutch members by the side gears upon increased application of torque to the mechanism casing. As was indicated, the initial preload of the clutch members 26 is provided by the biasing mechanism 28.

Figure 3:
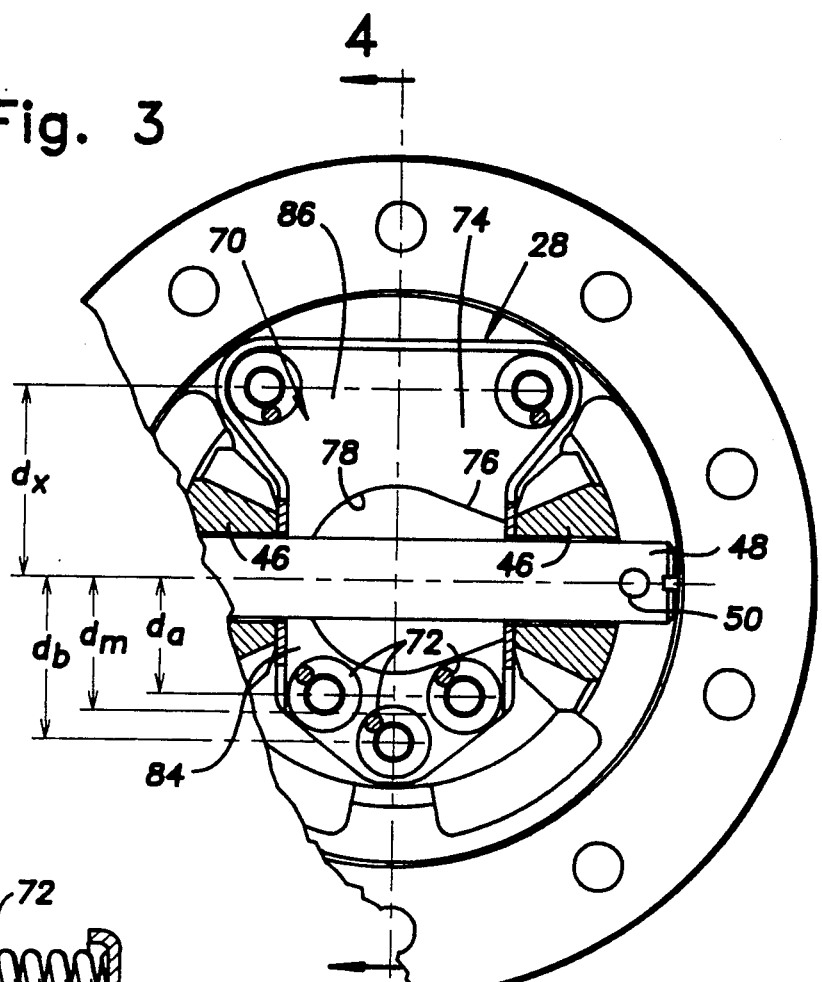
FIG. 3 is a cross-sectional view of the apparatus of FIG. 1, the plane of the section being indicated by the line 3—3 in FIG. 1.

The biasing mechanism 28 includes a pair of spaced-apart plates 70 (FIGS. 3 and 4) between which are disposed a plurality of compression coil springs 72. The plates 70 include transverse walls 74 which are in abutting contact with the faces 42 of the side gears 40 and transfer the axial load of the springs 72 which are in a compressed condition, to the clutch members 52 through the side gears 40.

Figure 5:
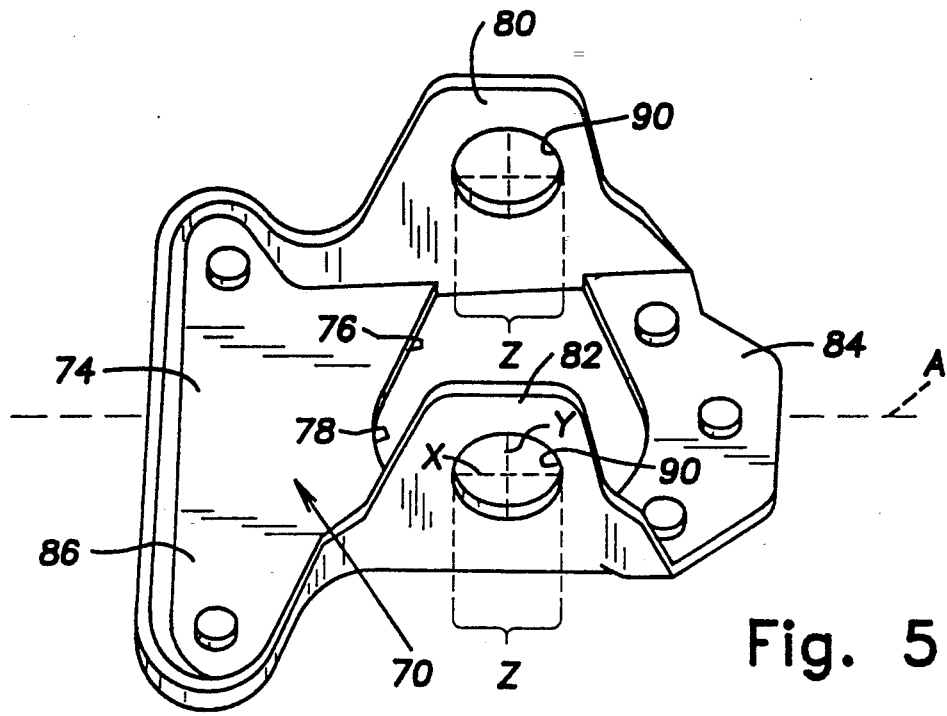
FIG. 5 is an elevational view of a spring plate according to this invention.

Each plate 70 includes an aperture 76 formed in the transverse wall 74 and having a circular portion 78 in alignment with the recess 44 in each side gear (FIG. 5). As may be noted, each plate 70 is identical to and is adapted to mate with an opposed plate. Thus, each inwardly directed wall 80 and 82 overlaps an inwardly directed wall 80 and 82 of the other plate so that the circular portion 78 of each aperture 76 is a semi-circle and together, the circular portion 78 define a complete circle. The aperture 76 is extended tangentially to the side wall 80 so that an upper portion of the side wall 82 on the other plate 70 may be received therein. Further, it may be noted that the side wall 82 is located closer to the longitudinal axis A of the plate 70 than the side wall 80 by a distance corresponding to the thickness of the side wall 80 to ensure symmetrical registry of the plates 70.

The transverse walls 74 of each plate 70 includes straight portions 84 and flared portions 86. This configuration allows for the insertion and removal of the biasing means 28 into position between the side gears 40 through the side port opening 38. The side walls 80 and 82 include apertures 90 therethrough. The apertures 90 are not perfect circles but have a minor axis X which corresponds to the diameter of the pinion shaft 48 and a major axis Y which is slightly larger. This arrangement permits the plates to be movable in the direction of the axle shafts 14 to perform the biasing function.

The compression springs 72 which provide the axial force upon the clutch members are positioned in clusters adjacent opposite ends of the plates 70. In the illustrated embodiment (FIG. 3), a group of three springs is positioned to act upon the straight portions 84 of the transverse walls and two springs are positioned to act upon the flared portions 86.

The two springs acting upon the flared portions 86 are spaced apart laterally a distance sufficient to allow insertion of the split washer 20 into the cavity 44 without the necessity of removal of the biasing means from its position within the mechanism. Since the flared portions 86 of the transverse wall 74 are disposed adjacent the side port 38 of the casing, the split washers may readily be inserted into the mechanism for assembly of the differential mechanism into the axle system.

Each of the springs 72 are of equal size and spring rate and since it is desireable to uniformly load the clutch members 52, the springs 72 are arranged such that the moment center of the biasing means is in alignment with the longitudinal center line of the output shaft. To this end, the springs acting on the flared portions 86 of the plates 70 are disposed a projected distance $D_x$ (referring to FIG. 3) from the center line of the output shafts which distance is equal to three-halves the distance $D_m$ which represents the mean projected distance from the output shaft center line to the springs acting upon the straight portions 84. The mean diameter $D_m$ is equal to the distance $D_a$ at which distance two of the springs acting upon the straight portions 84 are disposed plus one-third of the difference between the distance $D_a$ and the distance $D_b$ at which distance one spring is acting upon the straight portions.

Figure 4:
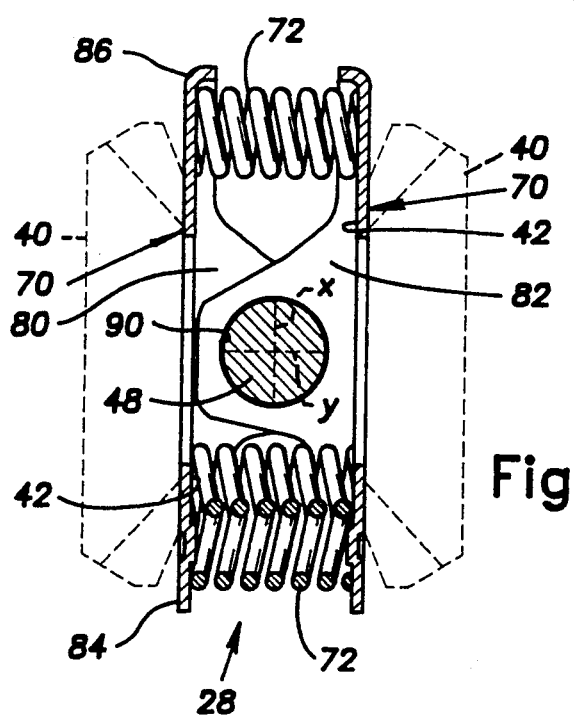
FIG. 4 is a cross-sectional view of a portion of the apparatus shown in FIG. 3, the plane of the section being indicated by the line 4—4 in FIG. 3.

As may be appreciated from an inspection of FIG. 4, the reaction force to the spring pressure is exerted by the side gears in a relatively narrow, annular zone radially inwardly of the force exerted by the springs. These forces cause a bending moment in the plate 70 in a zone Z directly beneath the openings 90. According to this invention, this bending moment is resisted by areas of the straight portions 80 and 82 located on the opposite sides of the apertures 90 with respect to the zones Z.

Figure 6:
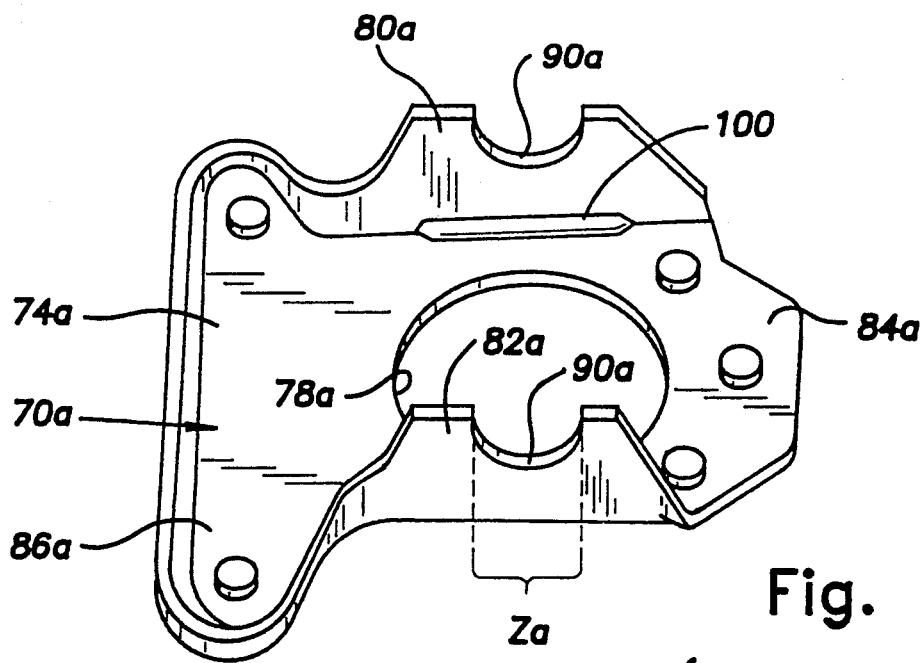
FIG. 6 is a perspective view of a spring plate according to the prior art.

FIG. 6 illustrates a prior art spring retaining plate of the type set forth in U.S. Pat. No. 3,400,611 and parts of that plate 70a are provided with reference characters identical to the reference characters of the plate A illustrated in FIG. 5 with the addition of the subscript "a". Reaction pressure concentrated in a relatively narrow, annular zone about the aperture 78a results in a bending moment in the zone $Z_a$ beneath the semi-circular opening 90a. This is unresisted by any portions of the straight portions 80a or 82a and there existed the possibility of plate bending or failure. According to prior art practices, a weldment 100 was provided in the area $Z_a$ at the intersection of the straight portions 80a and 82a and the base of the plate 70a. While this procedure minimized plate bending, or failure, it provided an expensive additional operation in the manufacture of the plate.

Although the preferred embodiment of this invention has been shown and described, it should be understood that various modifications and rearrangements of the parts may be resorted to without departing from the scope of the invention as disclosed and claimed herein.

What is claimed is:

1. In a limited slip differential mechanism for an axle system having a pair of coaxially aligned, relatively rotatable output shafts including spaced-apart, juxtaposed ends, a differential casing including a pair of apertures adapted to receive the output shafts and defining an internal cavity surrounding said juxtaposed ends, a bevel gear system including pinion gears mounted on a pinion shaft disposed within said cavity and adapted to be connected to the output shafts to transfer rotational effort thereto, at least one clutch disposed within said cavity and adapted to be connected to said output shafts to resist differential action, biasing means disposed within said cavity including a pair of spaced-apart plates operatively associated with said clutch and a plurality of springs interposed between said plates providing a spring force urging said plates in a direction affecting frictional engagement of said clutch, in combination therewith the improvement wherein said plates of said biasing means include parallel side walls, each said parallel side walls having an aperture therein so that each said side wall completely encircles said pinion shaft to provide bridging means on one side of said aperture which is adapted to resist bending moments on another side of said aperture which result from said spring force on said plates.

2. A limited slip differential according to claim 1 wherein said springs of said biasing means comprise compression coil springs.

3. A limited slip differential according to claim 1 wherein said apertures in said side walls are elongated in a direction corresponding to the direction of said spring force.

4. A limited slip differential according to claim 2 wherein each said plate of said biasing means includes a transverse wall having a straight portion and a flared portion, said springs being disposed intermediate said transverse walls and urging each wall in a direction away from the other of said walls, with said spaced-apart springs acting upon said straight portion and said flared portions.

5. A limited slip differential mechanism according to claim 4 wherein said bevel gear system includes a pair of spaced-apart side gears, each said side gear being connected to one of the output shafts for rotation therewith and axial movement with respect thereto, and said biasing means being disposed intermediate said side gears with a straight portion of each one of said transverse walls in contact with one of said side gears.

6. A limited slip differential mechanism according to claim 5 wherein said biasing means applies a biasing force against each plate at locations which are radially spaced from an annular zone of contact between a side gear and a plate and wherein a zone of each side wall of a plate located above the aperture in the side wall resists bending moments caused by said biasing means.

* * * * *